United States Patent [19]

Terashima

[11] 4,397,265

[45] Aug. 9, 1983

[54] PARTICLE LEVEL SENSING APPARATUS

[75] Inventor: Isamu Terashima, Hitachi, Japan

[73] Assignee: Hitachi, Ltd., Tokyo, Japan

[21] Appl. No.: 299,632

[22] Filed: Sep. 4, 1981

[30] Foreign Application Priority Data

Sep. 8, 1980 [JP] Japan ................................ 55-123595

[51] Int. Cl.³ ............................................ G03G 15/08
[52] U.S. Cl. ..................................... 118/694; 118/657
[58] Field of Search ................................ 118/694, 657

[56] References Cited

U.S. PATENT DOCUMENTS 3,834,806 9/1974 Whited ............................ 118/694 X Primary Examiner—Bernard D. Pianalto
Attorney, Agent, or Firm—Antonelli, Terry & Wands

[57] ABSTRACT

Disclosed is a particle level sensing apparatus which comprises a particle container at least two electrodes disposed at a predetermined position in the container for providing a capacitance therebetween, an element for detecting a change in the capacitance which occurs depending on whether or not the particles are present between the electrodes, and an element for imparting vibration to at least one of the two electrodes thereby preventing adhesion of the particles to the electrodes.

13 Claims, 4 Drawing Figures

PARTICLE LEVEL SENSING APPARATUS

This invention relates to apparatus for sensing the level of particles contained in, for example, a particle container, and more particularly to a particle level sensing apparatus used for sensing the level of toner particles used for development in electrophotography.

It is known well from the disclosure of, for example, Japanese Patent Application Laid-open No. 74346/77 that the inter-electrode capacity between a pair of opposite electrodes changes depending on whether or not dielectric particles are present between the electrodes, and the change in the inter-electrode capacity is detected for sensing the level of the particles.

Due to, however, the fact that the fluidity of such particles is generally very low, and the particles tend to adhere to the electrodes, it is necessary for a sensing apparatus based on the method above described to increase the distance between the electrodes to avoid the above problem so that clogging of the inter-electrode space with the particles can be prevented, and the adverse effect due to adhesion of the particles to the electrodes can be minimized.

In such a prior art sensing apparatus in which the distance between the electrodes is increased to avoid the problem described above, it has been necessary to increase the surface area of the electrodes for compensating the decrease in the inter-electrode capacity due to the increase in the distance between the electrodes, resulting in a bulky apparatus. When the surface area of the electrodes cannot be so increased because of dimensional limitations, the apparatus has required a capacity-change sensing circuit capable of sensing a minute capacity change with high sensitivity. The prior art sensing apparatus has thus had the defect of expensiveness in any case.

It is therefore a primary object of the present invention to provide a particle level sensing apparatus which obviates prior art defects as pointed out above and which is small in size, can be conveniently handled and can sense the particle level with improved reliability.

In accordance with one aspect of the present invention which attains the above object, there is provided a particle level sensing apparatus comprising a container containing particles therein, at least two electrode means disposed at a predetermined position in the container for providing a capacitance therebetween, means for sensing the particle level by detecting a capacitance change occurring depending on whether or not the particles are present between the electrode means, and means for imparting vibration to at least one of the two electrode means.

The above and other objects, features and advantages of the present invention will become more apparent from the following detailed description of a preferred embodiment thereof taken in conjunction with the accompanying drawings, wherein:

DETAILED DESCRIPTION OF THE DRAWING

Figure 1:
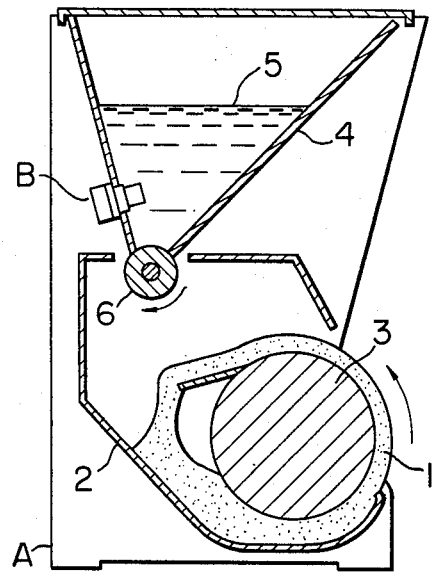
FIG. 1 is a schematic sectional view of a developing apparatus used in a dry-process reproducing apparatus and having mounted thereon a preferred embodiment of the particle level sensing apparatus according to the present invention.

Referring first to FIG. 1, a developing apparatus generally designated by A includes a developer container 2 containing a developer 1 in the form of a mixture of magnetic carriers and toners, and the developer 1 is attracted to and conveyed by a rotating magnet 3 to develop an image in a well known manner in the art. In order that the toner consumed by the development can be replenished as required, a toner container 4 containing toner particles 5 is provided to supply the developer container 2 with the toner particles 5 by rotation of a toner supply roller 6.

An embodiment of the toner particle level sensing apparatus according to the present invention (which will be referred to hereinafter simply as a level sensing apparatus) is generally designated by the symbol B, and the level sensing apparatus B is shown mounted at a predetermined position on the toner container 4.

Figure 2:
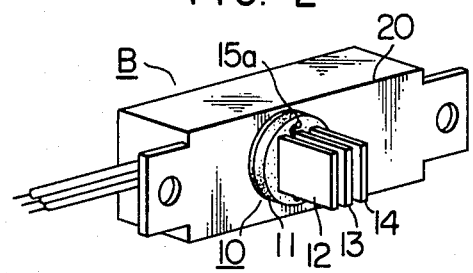
FIG. 2 is a perspective view of a sensing unit in the particle level sensing apparatus embodying the present invention.
Figure 3:
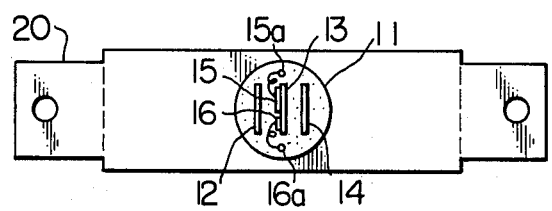
FIG. 3 is a front elevation view of the sensing unit.

This level sensing apparatus B has a mechanical structure as shown in FIGS. 2 and 3 and comprises an electrical circuit which is shown in and described later with reference to FIG. 4. The circuit is disposed within a casing 20 shown in FIGS. 2 and 3.

Referring to FIGS. 2 and 3, reference numeral 10 designates a sensing unit; 11, a base of electrical insulator; 12, 13 and 14, a first electrode, a second electrode and a third electrode respectively; 15, a main piezo-electric element; 15a, a terminal for the piezo-electric element 15; 16, a feedback piezo-electric element; 16a, a terminal for the piezo-electric element 16; and 20, the casing.

It will be seen in FIGS. 2 and 3 that the sensing unit 10 is composed of the first, second and third electrodes 12, 13 and 14 supported on the insulator base 11, the main piezo-electric element 15, the feedback piezo-electric element 16, and the terminals 15a and 16a for the respective piezo-electric elements 15 and 16.

The main piezo-electric element 15 is bonded to the central second electrode 13 to cause forced vibration of the second electrode 13 and is electrically connected to the terminal 15a. The feedback piezo-electric element 16 is also bonded to the second electrode 13 to generate a voltage corresponding to the amplitude of vibration of the second electrode 13 and is electrically connected to the terminal 16a.

Of course, the two piezo-electric elements 15 and 16 may be molded into an integral structure instead of being separately prepared, and electrodes insulated from each other may be mounted on the piezo-electric element of integral structure and may then be electrically connected to the terminals 15a and 16a respectively.

The second electrode 13 having the piezo-electric elements 15 and 16 mounted thereon is designed to resonate at a frequency of about 2 kHz.

Each of the first and third electrodes 12 and 14 is mounted on the insulator base 10 in parallel relation with the second electrode 13 and is spaced apart from the second electrode 13 by a distance of 1.5 mm to 3 mm. The size and material of the first and third electrodes 12 and 14 are the same as those of the second electrode 13, and the first and third electrodes 12 and 14 are acoustically coupled to the second electrode 13 for resonance.

Further, the first and third electrodes 12 and 14 are electrically connected with each other so as to form a sensing capacitor $C_0$ together with the second electrode 13 as shown in and described later with reference to FIG. 4.

The casing 20 supports the sensing unit 10 in a manner as shown in FIG. 3 and houses therein a detecting circuit connected to the sensing unit 10.

Figure 4:
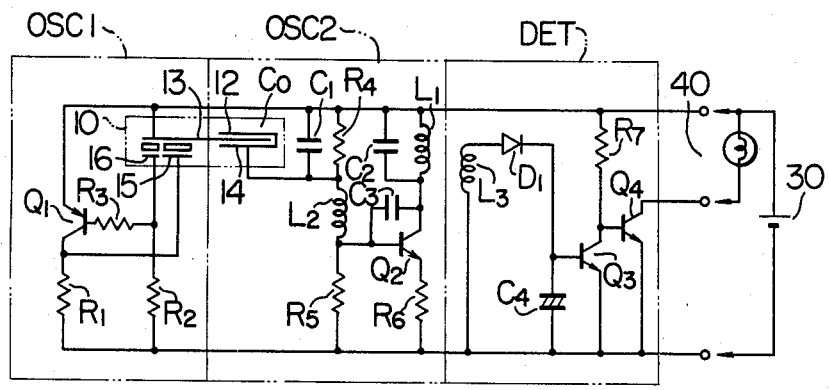
FIG. 4 is a general circuit diagram of the sensing apparatus, that is, a circuit diagram of the sensing unit to which a detecting circuit is connected.

FIG. 4 is a general circuit diagram of the level sensing apparatus B embodying the present invention.

Referring to FIG. 4, reference numeral 30 designates a power source, and 40 designates an indicator lamp. Reference symbols $Q_1$ to $Q_4$ designate transistors; $D_1$, a diode; $R_1$ to $R_7$, resistors; $C_1$ to $C_4$, capacitors; and $C_0$, a sensing capacitor. In FIG. 4, symbols $OSC_1$, $OSC_2$ and DET designate a first oscillating circuit, a second oscillating circuit and a detecting circuit respectively.

It will be seen in FIG. 4 that the main and feedback piezo-electric elements 15 and 16 constitute the first oscillating circuit $OSC_1$ together with the resistors $R_1$ to $R_3$ and the transistor $Q_1$ so as to cause mechanical vibration of the second electrode at a frequency of about 2 kHz.

The second oscillating circuit $OSC_2$ acts as a back coupling oscillator and is composed of the sensing capacitor $C_0$, the capacitors $C_1$ to $C_3$, the resistors $R_4$ to $R_6$, the transistor $Q_2$, and the coils $L_1$ and $L_2$ mutually coupled.

The condition of oscillation of this back coupling oscillator is determined by the capacitance of the capacitor $C_1$ connected in parallel with the resistor $R_4$ and that of the sensing capacitor $C_0$ formed between the second electrode 13 and the first and third electrodes 12 and 14 electrically connected to each other. Therefore, the constants of the above circuit elements are suitably selected to satisfy the condition of oscillation. More precisely, it is so arranged that no oscillation occurs when the toner particles are not present between the first, second and third electrodes 12, 13 and 14, while oscillation takes place when the toner particles are present between these electrodes 12, 13 and 14.

In an experiment using toner particles whose main constituent was styrol, the electrodes 12, 13 and 14 were sized to have a rectangular shape of 1 cm × 3 cm, and the distance therebetween was selected to be 2.5 mm. According to the experimental results, the capacitance of the sensing capacitor $C_0$ was about 4.0 pF when the toner particles were not present between the electrodes and was about 6.0 pF when the toner particles were present between the electrodes.

Further, the amplitude of vibration of the second electrode 13 was about 10 μm, and the capacity change due to this vibration was negligible compared with the above-described capacity change dependent on the presence or absence of the toner particles between the electrodes.

The detecting circuit DET is composed of the coil $L_3$ wound in close proximity to the coil $L_1$ for detecting the condition of oscillation of the second oscillating circuit $OSC_2$, the diode $D_1$ rectifying the AC voltage induced in the coil $L_3$, the capacitor $C_4$ smoothing the output from the diode $D_1$, and the combination of the resistor $R_7$ and the transistors $Q_3$, $Q_4$ constituting an amplifying circuit. An indication circuit including the indicator lamp 40 is connected to the detecting circuit DET.

In operation, when the level sensing apparatus is operatively connected to the power source 30, the first oscillating circuit $OSC_1$ is energized to impart vibration to the second electrode 13, and the first and third electrodes 12 and 14 vibrate in resonance with the vibration of the second electrode 13.

It will be seen from the above description that the sensing capacitor $C_0$ has a small capacitance when the toner particles are not present between the electrodes 12 to 14, with the result that the second oscillating circuit $OSC_2$ would not oscillate.

Consequently, the indicator lamp 40 is energized to indicate that the toner contained in the toner container 4 has been consumed.

On the other hand, when the toner particles are present between the first, second and third electrodes 12, 13 and 14, the capacitance of the sensing capacitor $C_0$ increases, and the second oscillating circuit $OSC_2$ oscillates to induce a voltage across the coil $L_2$, thereby de-energizing the indicator lamp 40.

Then, when the toner level in the toner container 4 drops down to a position lower than that of the sensing unit 10, the vibration of the first, second and third electrodes 12, 13 and 14 removes the toner particles from between the electrodes and also prevents adhesion of the toner particles to the electrodes themselves.

According to the experimental results, the value of the frequency of oscillation effective for causing vibration of the second electrode 13 is higher than and including 200 Hz. The electrodes will require larger dimensions when the frequency is lower than the above value, and sound which is quite inconsonant to the ear will be produced when the frequency exceeds about 3 kHz of the audible frequency range.

Further, when the frequency lies in the ultrasonic range, large energy will be required for causing forced vibration of the second electrode 13 at the desired amplitude of about 10 μm, and objectionable adhesion of the toner particles to the electrodes by fusion tends to occur due to the temperature rise of the electrodes. Thus, the frequency of about 2 kHz was most suitable for practical use. In view of the above conditions, the frequency of oscillation effective for causing the vibration of the second electrode 13 is preferably about 200 Hz to 2,000 Hz.

According to the embodiment of the present invention described hereinbefore, it can be summarized that the following effects can be exhibited:

(A) It is merely necessary to cause vibration of only one of the electrodes for preventing objectionable adhesion of toner particles not only to that electrode but also to the other electrodes.

(B) The electrodes of small dimensions can ensure sensing of the toner particle level with high reliability.

(C) The large rate of change of the capacitance simplifies the structure of the detecting circuit.

While the embodiment of the present invention has been described with reference to its application to the sensing of the level of toner particles by way of example, it is apparent that the present invention is also equally effectively applicable to the sensing of the level of particles other than the toner particles. In the latter case, the surface of the electrodes is subjected to electrical insulating treatment in the practical application when the particles are electrically conductive.

In the embodiment of the present invention described by way of example, the electrode assembly has been such that three flat electrodes are disposed in juxtaposed relation, and the two outer electrodes are electrically connected with each other, so that the two outer electrodes can provide an electromagnetic shielding effect. It is apparent, however, that two electrodes, instead of three electrodes, can achieve the same effect when the necessity for electromagnetic shielding is not taken into account or is neglected.

I claim:

1. A particle level sensing apparatus comprising:
   a container containing particles therein;
   at least two electrode means disposed at a predetermined position in said container for providing a capacitance therebetween;
   means for sensing a level of the particle by detecting a change in said capacitance which occurs depending on whether or not the particles are present between said electrode means; and
   means for imparting vibration to at least one of said two electrode means with a frequency of vibration selected to lie within the range of 200 Hz to 2000 Hz.

2. A particle level sensing apparatus as claimed in claim 1, wherein the other of said two electrode means is arranged to vibrate in resonance with the vibration of said one electrode means.

3. A particle level sensing apparatus as claimed in claim 2, wherein said vibration imparting means includes a piezo-electric element mounted on said one electrode means, and means for actuating said piezo-electric element, said piezo-electric element imparting vibration to said one electrode means when actuated.

4. A particle level sensing apparatus as claimed in claim 1, wherein said vibration imparting means includes a piezo-electric element mounted on said one electrode means, and means for actuating said piezo-electric element, said piezo-electric element imparting vibration to said one electrode means when actuated.

5. A particle level sensing apparatus as claimed in claim 1, 2, 4 or 3, wherein said means for sensing the particle level by detecting the capacitance change includes back coupling oscillator means whose amount of feedback is controlled by said capacitance change, so that the presence or absence of said particles between said electrode means is sensed depending on whether said oscillator means is in its oscillating condition or in its non-oscillating condition.

6. A particle level sensing apparatus as claimed in claim 5, wherein said means for sensing the particle level by detecting the capacitance change further includes indicator means electrically connected to said oscillator means to indicate the presence or absence of said particles between said electrode means in response to the oscillating or non-oscillating condition of said oscillator means.

7. A particle level sensing apparatus as claimed in claim 6, wherein three plane electrodes are disposed in parallel with each other in such a relation that the central plane electrode provides said one electrode means, and the two outer plane electrodes are electrically connected to each other to provide said the other electrode means.

8. A particle level sensing apparatus as claimed in claim 5, wherein three plane electrodes are disposed in parallel with each other in such a relation that the central plane electrode provides said one electrode means, and the two outer plane electrodes are electrically connected to each other to provide said the other electrode means.

9. A particle level sensing apparatus as claimed in claim 1, 2, 4 or 3, wherein three plane electrodes are disposed in parallel with each other in a relation that the central plane electrode provides said one electrode means, and the two outer plane electrodes are electrically connected to each other to provide said the other electrode means.

10. A particle level sensing apparatus as claimed in claim 1, wherein said vibration imparting means increases fluidity of the particles between said two electrode means to thereby prevent adhesion of the particles to said electrode means.

11. A toner level sensing apparatus for a toner supplying apparatus supplying toner particles to an electrophotographic developing apparatus comprising:
    a container containing the toner particles therein;
    means for supplying the toner particles to said developing apparatus from said container;
    at least two electrode means disposed at a predetermined position in said container for providing a capacitance therebetween;
    means for detecting a change in said capacitance which occurs depending on whether or not the toner particles are present between said electrode means thereby judging whether or not the toner particles in said container are present beyond said predetermined position; and
    means for imparting vibration to at least one of said two electrode means with a frequency of vibration selected to lie within the range of 200 Hz to 2000 Hz thereby preventing adhesion of the toner particles to said electrode means.

12. A toner level sensing apparatus as claimed in claim 11, wherein said vibration imparting means increases fluidity of the toner particles between said two electrode means to thereby prevent adhesion of the toner particles to said electrode means.

13. A toner level sensing apparatus as claimed in claim 12, wherein said vibration imparting means includes a piezo-electric element mounted on said at least one electrode means and means for actuating said piezo-electric element to impart vibration to said at least one electrode means.

* * * * *